United States Patent
Bassi et al.

(10) Patent No.: US 6,679,221 B2
(45) Date of Patent: Jan. 20, 2004

(54) CONTROLLING THE INJECTION IN A FUEL SYSTEM SELECTIVELY OPERABLE WITH GASOLINE OR FUEL GAS

(75) Inventors: Aldo Bassi, Milan (IT); Massimo Ferrera, Turin (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 10/002,118

(22) Filed: Dec. 5, 2001

(65) Prior Publication Data

US 2002/0035970 A1 Mar. 28, 2002

Related U.S. Application Data (63) Continuation of application No. 09/446,973, filed as application No. PCT/IT98/00295 on Oct. 26, 1998, now Pat. No. 6,367,443.

(30) Foreign Application Priority Data

Oct. 24, 1997 (IT) .......................... TO97A0933

(51) Int. Cl.[7] .............................. F02B 77/00
(52) U.S. Cl. .............................. 123/198 F; 123/27 GE; 123/525
(58) Field of Search .......................... 123/198 F, 525, 123/575, 27 GE (56) References Cited

U.S. PATENT DOCUMENTS

| | | | | | |
|---|---|---|---|---|---|
| 3,100,478 | A | * | 8/1963 | Crooks .................... | 123/198 F |
| 4,434,767 | A | * | 3/1984 | Kohama et al. ............ | 123/481 |
| 5,195,485 | A | | 3/1993 | Jensen et al. | |
| 5,268,842 | A | * | 12/1993 | Marston et al. ............. | 123/480 |
| 5,540,633 | A | * | 7/1996 | Yamanaka et al. ........ | 123/198 F |
| 5,553,575 | A | * | 9/1996 | Beck et al. ............... | 123/198 F |
| 5,592,924 | A | * | 1/1997 | Audisio et al. ............. | 123/525 |
| 5,713,336 | A | * | 2/1998 | King et al. ................. | 123/525 |
| 5,735,248 | A | * | 4/1998 | Matsuura et al. ........... | 123/527 |
| 5,826,563 | A | * | 10/1998 | Patel et al. ............... | 123/198 F |
| 5,884,603 | A | * | 3/1999 | Matsuki ................... | 123/198 F |
| 6,125,812 | A | * | 10/2000 | Garabedian ............. | 123/198 F |

FOREIGN PATENT DOCUMENTS

IT  WO 97/47867  12/1997

* cited by examiner

Primary Examiner—Noah Kamen
(74) Attorney, Agent, or Firm—Crowell & Moring LLP (57) ABSTRACT

A control method comprises the steps of: selectively supplying fuel gas to some cylinders of an engine on the basis of the power required from it; selecting the quantity of fuel gas supplied to each of the cylinders; and selecting, in successive engines cycles, different cylinders to supply with fuel gas according to a predetermined scheme of rotation.

17 Claims, 7 Drawing Sheets

CONTROLLING THE INJECTION IN A FUEL SYSTEM SELECTIVELY OPERABLE WITH GASOLINE OR FUEL GAS

This application is a continuation of application Ser. No. 09/446,973, filed Mar. 22, 2000 now U.S. Pat. No. 6,367,443, which is a 371 of PCT/IT98/00295 filed Oct. 26, 1998.

TECHNICAL FIELD

The present invention relates to a method for controlling the injection in a fuel injection system of an internal combustion engine which can operate selectively with petrol or fuel gas, and an associated injection system.

BACKGROUND ART

As is known, the increasingly severe limits imposed by the various legislations against pollution emissions from internal combustion engines have created a new interest on the part of manufacturers for fuel gas engines.

Initially, fuel gas engines were provided with a device for metering fuel gas to be mixed with air supplied to the engine in an arrangement similar to that of a normal carburettor of a petrol engine.

With development in technology this arrangement became unacceptable in that it did not lend itself to operating in conjunction with an electronic engine control system, in particular one able to control the fuel metering as a function of the composition of the exhaust gases detected by means of a lambda probe.

Subsequently, engines which could run on fuel: gas and which were provided with an injection system were therefore studied.

The increasing use of this type of engine, operating selectively with petrol injection or fuel gas, has required the study and development of ever more efficient injection control methods in terms of the level of pollution and energy efficiency.

DISCLOSURE OF INVENTION

The object of the present invention is that of providing an injection control method and an injection system which makes it possible to obtain reduced levels of pollution and high energy efficiency in all operating conditions of the engine.

According to the present invention there is provided a method for controlling a fuel injection system for an internal combustion engine having a plurality of cylinders and selectively operable with petrol injection or fuel gas, the method including supplying fuel gas to the cylinders, characterized in that in each engine cycle the fuel gas is supplied selectively to some of the cylinders of the engine on the basis of the required power.

According to the present invention there is further provided a fuel injection system for an internal combustion engine having a plurality of cylinders and selectively operable with petrol or fuel gas, characterized in that it includes a fuel gas supplier selectively operable to supply fuel gas, in each engine cycle, selectively to some of the cylinders of the engine on the basis of the required power.

BRIEF DESCRIPTION OF THE DRAWINGS

For a better understanding of the present invention a preferred embodiment will now be described purely by way of non-limitative example, with reference to the attached drawings, in which.

BEST MODE FOR CARRYING OUT THE INVENTION

Figure 1:
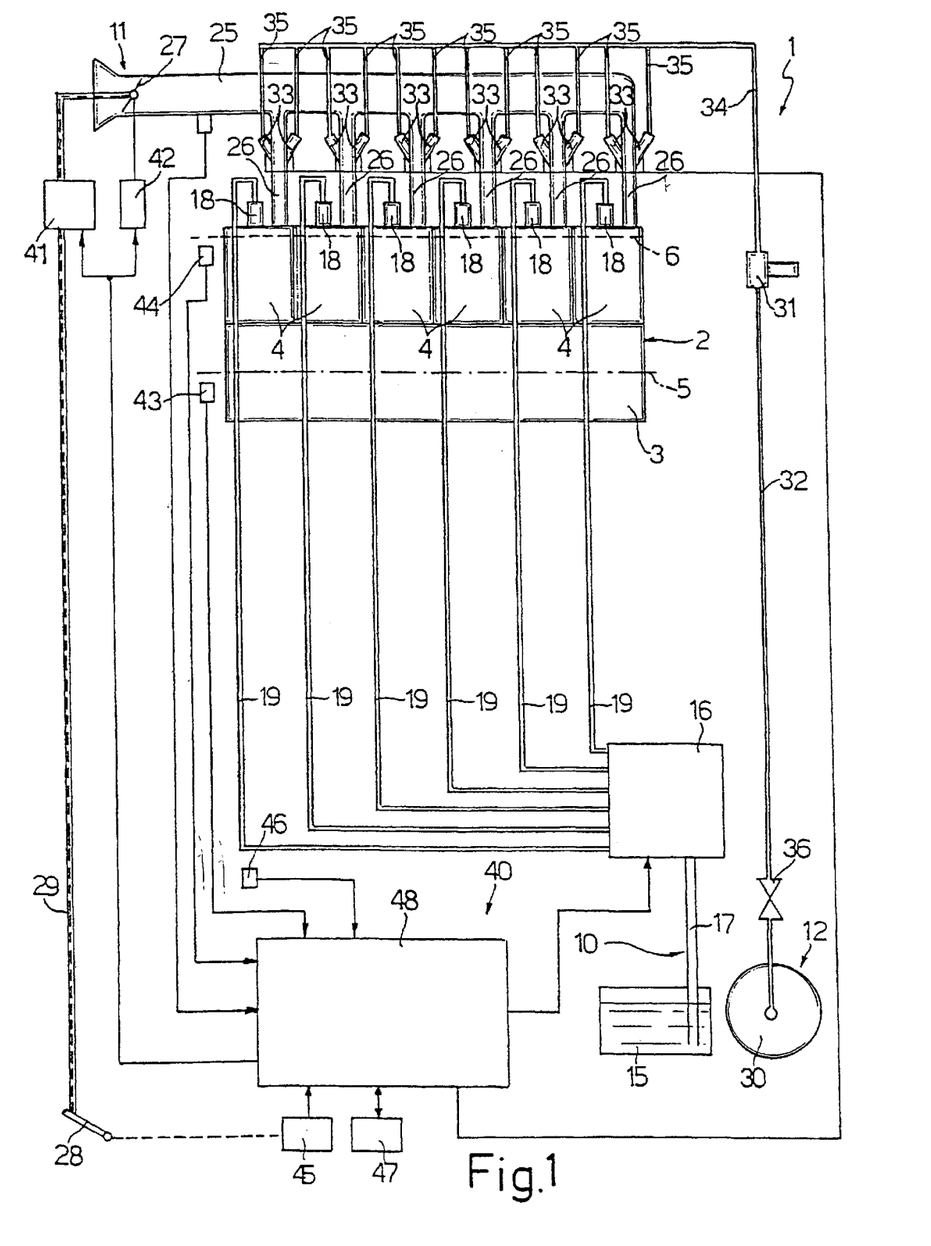
FIG. 1 is a simplified diagram of a fuel injection system for an internal combustion engine operable selectively with petrol or fuel gas according to the present invention.

In FIG. 1 the reference numeral 1 generally indicates a fuel injection system for an internal combustion engine 2 capable of running selectively on petrol or fuel gas and comprising a crank case 3, cylinders 4, a crankshaft 5 and a cam shaft 6 (these latter two being shown as broken lines).

The fuel injection system 1 comprises a petrol supply circuit 10, an air supply circuit 11 and a fuel gas supply circuit 12 (tyically supplying methane, propane, butane, butane, ethane or LPG).

The petrol supply circuit 10 which is of known type and shown schematically, comprises a tank 15, an injection pump 16 connected to the tank 5 via a low pressure delivery line 17, and a plurality of injectors 18 associated with respective cylinders 4 of the engine 2 and connected to the injection pump 16 by respective high pressure delivery lines 19 for injecting petrol into the cylinders 4.

The air supply circuit 11, which is also of known type and shown schematically, comprises a main duct 25 for the aspiration of external air and a plurality of secondary ducts 26 extending from the main duct 25 and connected to respective cylinders 4 of the engine 2 for conveying air from the main duct 25 into the combustion chambers of the cylinders 4.

The air supply circuit 11 further includes a butterfly valve 27, also of known type and therefore not described in detail, disposed in the main duct 25 for regulating the flow of air supplied to the secondary duct 26 and therefore to the combustion chambers of the cylinders 4.

The butterfly valve 27 is controlled in a known way by a control member 28, for example an accelerator pedal, via a control element 29.

The fuel gas supply circuit 12 comprises a high pressure fuel gas tank 30 (about 200 bar); a pressure regulator 31 connected to the tank 30 via a high pressure delivery line 32 (shown as a double line) for reducing the pressure of the fuel gas contained in the tank 30 down to 2–8 bar; a low pressure delivery line 34 (also shown as a double line) connected to the pressure regulator 31; and a plurality of electrically operated injectors 33 connected to the low pressure delivery line 34 via a plurality of connectors 35.

In the particular embodiment illustrated the electric injectors 33 are disposed in pairs on the secondary ducts 26 for infecting fuel gas into the associated secondary ducts 26 themselves.

In the high pressure delivery line 32 there is further disposed a safety solenoid valve 36 the purpose of which is to stop the supply of fuel gas to the injectors 33 in the event of malfunctioning in the injection system 1.

The fuel injection system 1 further includes a control device 40 the purpose of which is to manage the operation of the engine 2 according to the method which forms the subject of the present invention.

The control device 40 includes a, selective de-coupling device 41 for de-coupling the control member 20 from the butterfly valve 27, which is of known type and therefore not described in detail, and a device 42 for regulating the position of the butterfly valve 27. In particular, the regulation device 42 for the butterfly valve 27 comprises a stepping motor the purpose of which is to regulate the position of the butterfly valve 27 after it has been de-coupled from the control member 28 in a manner which will be described in more detail hereinbelow.

The control device 40 further includes a speed sensor 43, typically a phonic wheel, coupled to the crankshaft 5 and generating a speed signal RPM correlated to the speed of rotation of the crankshaft 5 itself (engine speed); first position sensor 44 coupled to the cam shaft 6 and generating a first position signal Φ correlated to the angular position of the cam shaft 6 (engine phase); a second position sensor 45 connected to the control member 28 and generating a second position signal θ correlated to the position of the control member 28 itself; a temperature sensor 46 disposed in the exhaust (not illustrated) of the engine 2 and generating a temperature signal T correlated to the temperature of the exhaust gas (and therefore to the temperature of the engine 2); a memory 47 in which is stored an electronic mapping containing operating data; and an electronic central control unit 48 receiving input signals θ, Φ, RPM and T, connected to the memory 47 and serving to generate a plurality of output control signals for the fuel gas injectors 33, the selective de-coupling device 41, the regulation device 42, the safety solenoid valve 36, the injection pump 16 and the injectors 18.

The control device 40 also includes further sensors (not illustrated) supplying respective output signals to the electronic central control unit 48 in such a way as to allow it to monitor the operation of the injection system 1. In particular, there could be provided: a further temperature sensor disposed on the radiator (not illustrated) of the engine 2 in such a way as to generate a temperature signal correlated to the temperature of the coolant water; an air pressure sensor disposed in the main air intake duct 25 in such a way as to generate a pressure signal correlated to the air pressure within the main duct 25 itself; and a fuel gas pressure sensor disposed in the low pressure delivery line 34 of the fuel gas supply circuit 12 in such a way as to generate a pressure signal correlated to the pressure f the fuel gas within the delivery line 34.

According to the present invention, upon a request, for example made by the driver of the vehicle, to current from operation of the engine 2 with petrol to operating with fuel gas, the electronic central control unit 48 first of all interrupts the supply of fuel to the injectors 5 and completely opens the butterfly valve 27, and then manages the injection of fuel gas into each cylinder 4 according to a modular strategy. This management is by selectively supplying fuel gas during each engine cycle to all or only to some of the cylinders 4 of the engine 2 on the basis of the power required from the engine 2, by selecting the quantity of fuel gas supplied to each cylinder 4 in each engine cycle and furthermore, by selecting in successive engine cycles different cylinders 4 to supply with fuel gas according to a predetermined scheme of rotation for optimising the degree of periodic irregularity of the engine 2 and therefore the operating regularity and the noise emitted by the engine 2.

In particular, the electronic central control unit 48 determines, in each engine cycle and on the basis of the speed signal RPM and the position signals Φ, θ, the number of injectors 33 to be operated and which injectors 33 must be operative for the purpose of providing the overall power required from the engine 2, at the same time guaranteeing that the quantity of fuel gas injected by each injector 18 is sufficient for ignition of the associated air/gas mixture (a mixture above the limit of ignitability). In this way, by supplying fuel gas only to some of the cylinders 4 it is possible to deliver from the engine 2 a power lower than that which would be delivered with all the cylinders supplied with fuel gas and air/gas mixture above the limit of ignitability, and at a charge density greater than that of engines supplied conventionally with fuel gas, thereby improving consumption and efficiency of the engine.

More precisely, by utilising, as in the example illustrated in FIG. 1, an engine 2 having six cylinders 4 with two fuel gas injectors 33 of ON/OFF type for each cylinder 4, the quantity of fuel gas which can be injected into the engine 2 in each engine cycle can be varied discretely over several levels, namely between the minimum level, in which one injector 33 of the fuel gas is supplied (in rotation according to a predetermined scheme, as previously mentioned), and a maximum level in which all twelve fuel gas injectors 33 are supplied. Alternatively, a single injector 33 may be utilised for each cylinder 4 so as to inject different quantities of fuel gas into the associated cylinder 4. In particular, the quantity of fuel gas injected by each injector 33 may vary continuously between a minimum value corresponding to the limit of ignitability of the air/gas mixture, and a maximum value which can be determined as a function of the stoichiometric ratio of the air/gas mixture. The quantity of fuel gas injected by each injector 22 can be varied by modulating the time for which each of the injectors 33 is injecting.

Moreover, by suitably selecting the number of injectors 33 utilised in successive engine cycles it is possible further to modulate the power delivered by the engine 2.

In particular, the electronic central control unit 48 is able to control the supply of each cylinder 4 in a series of successive engine cycles and on the basis of the predetermined strategy.

Therefore, taking into consideration several successive engine cycles, in each of which only some cylinders 4 are supplied, the engine 2 thus delivers the average power required even with a strongly divided charge.

Figure 2:
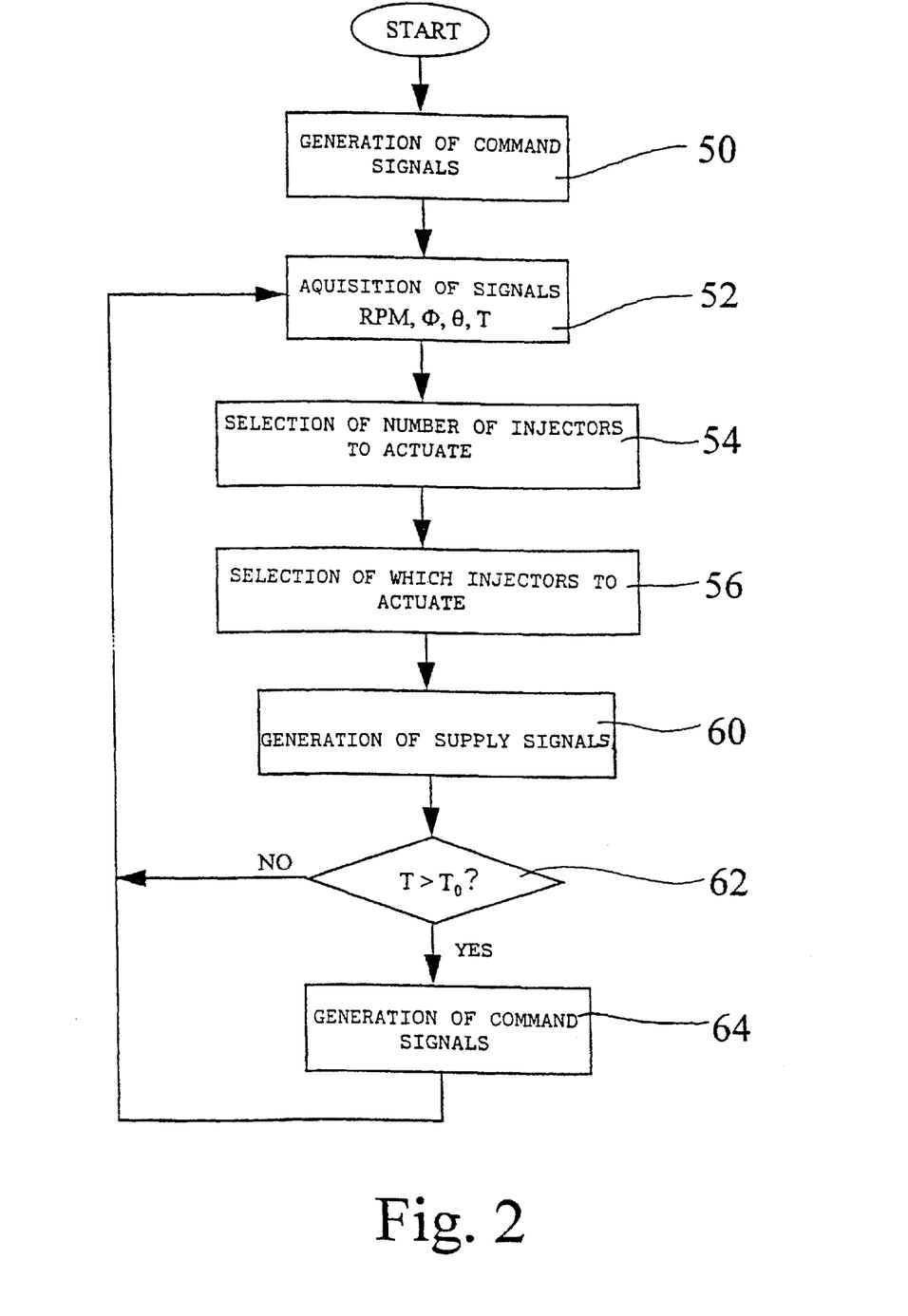
FIG. 2 is a flow diagram relating to the method forming the subject of the invention.

To implement the above-described modular strategy, initially, as illustrated in FIG. 2, the electronic central control unit 48 generates (block 50) a "stop petrol supply" command signal provided to the injection pump 16 in such a way as to stop the supply of the petrol to the injectors 18; a signal for commanding de-coupling supplied to the selective de-coupling device 41 in such a way as to de-couple the control member 20 from the butterfly valve 27; and an "open" command signal supplied to the regulation device 42 for controlling the position of the butterfly valve 27 in such a way as to position the butterfly valve 27 in an operative position in which it does not obstruct the free passage of air (butterfly valve 27 completely open).

Subsequently, the electronic central control unit 48 performs, in each engine cycle, the operations hereinafter described with reference to blocks 52–64.

In particular, the electronic central control unit 48 acquires the signals θ, Φ, RPM and T (block 52) and selects, on the basis of the signals θ and RPM, some operating data memorised in the memory 47 containing information on the number of injectors 33 to operate in each engine cycle (block 54).

The electronic central control unit 48 then determines, on the basis of the signals θ, Φ and RPM, the most suitable modular strategy, that is to say selects which fuel gas injectors 33 must be actuated in each engine cycle (block 56).

The electronic central control unit 48 then generates an actuation signal for opening each of the injectors 33 to be actuated (block 60).

Finally, the electronic central control unit 48 checks the temperature of the exhaust gas from the engine 2 by utilising the temperature signal T in that an excessively high exhaust gas temperature can seriously damage both the exhaust valves of the engine 2 and, in supercharged engines, the turbo compressor turbine. In particular, the central control unit 48 compares the temperature signal T with a predetermined threshold value $T_0$ (block 62); if the temperature signal T is lower than the threshold value $T_0$ (output NO from block 62) it returned to block 52 to repeat, in the next engine cycle, the operations described in blocks 52–64, otherwise if the temperature signal T is greater than the predetermined threshold $T_0$ (output YES from block 60) then the central unit 48 generates a fuel gas reduction command for preventing some of the injectors 33 from actuating in such a way as to reduce the quantity of fuel gas supplied to the engine 2 and therefore reduce its temperature (block 64). From block 64 it then returns to block 52 to repeat in the next engine cycle the operation described in blocks 52–64.

The advantages of the present method of control will be evident from the above. First of all, the above-described modular method of managing the injection of fuel gas allows the engine 2 to provide the power required whilst nevertheless avoiding having cylinders 4 in which the air/gas mixture is below the limit of ignitability with a very low charge density, thereby reducing the pumping cycle losses in the cylinder and, consequently, the levels of pollution of the engine 2, and increasing the energy efficiency of the engine 2 with respect to known engines.

Moreover, by managing which cylinders 4 to supply in rotation, the overall temperature control of the engine 2 is optimised and, therefore, its operation likewise.

Finally, the above-described method of controlling the injection is simple to implement and the associated control device 40 has low production costs, not requiring modification of the structure of the injection system, but only implementation of the injection strategy through the central control unit 48.

The instant of commencement of injection with respect to the position of the crankshaft 5 (initial phase of the engine 2) is of enormous importance to the correct operation of the engine 2 and to the division of the air/gas mixture to the various cylinders 4 of the engine 2 and this commencement instant varies according to whether methane or LPG is utilised.

According to the present invention, in the case of the use of methane, the injector 33 associated with a given cylinder 4 of the engine 2 is controlled to effect the injection of methane at the top dead centre point, that is to say when the associated induction valve is already open, whilst in the case of the use of LPG the injection of fuel gas into the first cylinder 4 of the engine 2 is effected upon receiving a first signal from the speed sensor 43 (phonic wheel) after starting of the engine 2 and subsequently the injection into the other cylinders 4 of the engine 2 is controlled in sequence, at regular intervals from the first injection.

Figure 3:
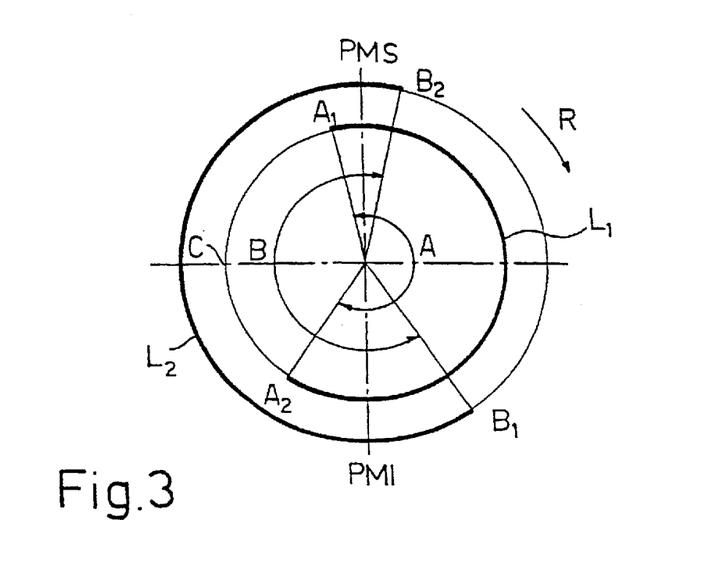
FIG. 3 is a diagram illustrating the induction and exhaust phases in one cylinder of the engine.

In particular as far as the use of methane is concerned, in FIG. 3 there is shown a diagram which illustrates the induction and exhaust phases of one cylinder 4 of an internal combustion engine 2 supplied with methane, as a function of the angle of rotation of the crankshaft 5. The lie indicated L1 refers to the range of crankshaft angles over which the induction valve of the cylinder is open whilst the line indicated L2 refers to the range of crankshaft angles over which the exhaust valve of the cylinder 6 is open; the arrow R indicates the direction of rotation of the crankshaft 2.

As will be seen, the induction valve opens at an angular position indicated 'A1', for example 2 degrees in advance of the top dead centre point (TDC) of the piston, and closes at an angular position indicated 'A2' is for example about 42 degrees after the achievement of the bottom dead centre point (BDC). The induction valve therefore remains open over an angular range of rotation of the crankshaft 5 indicated "An" in the drawing.

The exhaust valve of the cylinder under consideration opens, on the other hand, at an angular position indicated 'B1', for example in advance of the bottom dead centre point (BDC) by about 42 degrees and closes at an angular position indicated 'B2' for example about 2 degrees after top dead centre (TDC). The exhaust valve therefore remains open over an angular range indicated 'B' in the drawing.

According to the invention the methane injector device associated with a given cylinder of the engine is controlled to inject methane at the top dead centre point, that is to say when the induction valve is already open. In this way, the risk of the ingress of air/methane mixture into another cylinder of the engine and a consequent non-uniform division of thee mixture in the various cylinders is avoided. The said manner of operation is maintained while the engine is idling or in any case has a speed of rotation less than a determined value, for example of the order of 2,500 RPM. Above this value the injection is advanced in such a way as to be effected even in advance of the opening of the induction valve. For example, at a speed of rotation equal to 2,000 RPM the injection can be commanded at the point indicated in FIG. 8 with 'C', that is to say 90 degrees in advance of top dead centre. Above 5,000 RPM injection can be commanded at bottom dead centre.

In the case of the use of liquid petroleum gas (LPG) on the other hand, the injection of liquid LPG into the first cylinder 4 of the engine 2 is effected upon receiving a first signal from the speed sensor 43 (phonic wheel) after starting of the engine 2 and subsequently the injection into the other cylinders 4 of the engine 2 is controlled in sequence at regular intervals from the first injection.

This arrangement could appear to be non-optimum in that the instant of reception of the first signal from the speed sensor 43 could change from time to time in dependence on the speed sensor 43 and the variation of commencement of injection with respect to the position of the crankshaft 5 (initial phase of the engine 2) could have a negative effect on the correct operation of the engine 2 and on the division of the air/fuel mixture to the various cylinders of the engine 2.

Contrary to what may be expected, the Applicant has experimentally determined, on the other hand, that this variation does not in reality have any negative effect on the correct operation of the engine 2 and on the division of the air/LPG mixture to the various cylinders 4 of the engine 2 and that, therefore, the initial phasing of the engine 2 is not of any importance for the purpose of the correct operation of the engine 2. In this way the engine 2 may thus be free from means acting to provide a predetermined phasing of the commencement of injection into the various cylinders 4 with respect to the angular position of the crankshaft S.

Figure 4:
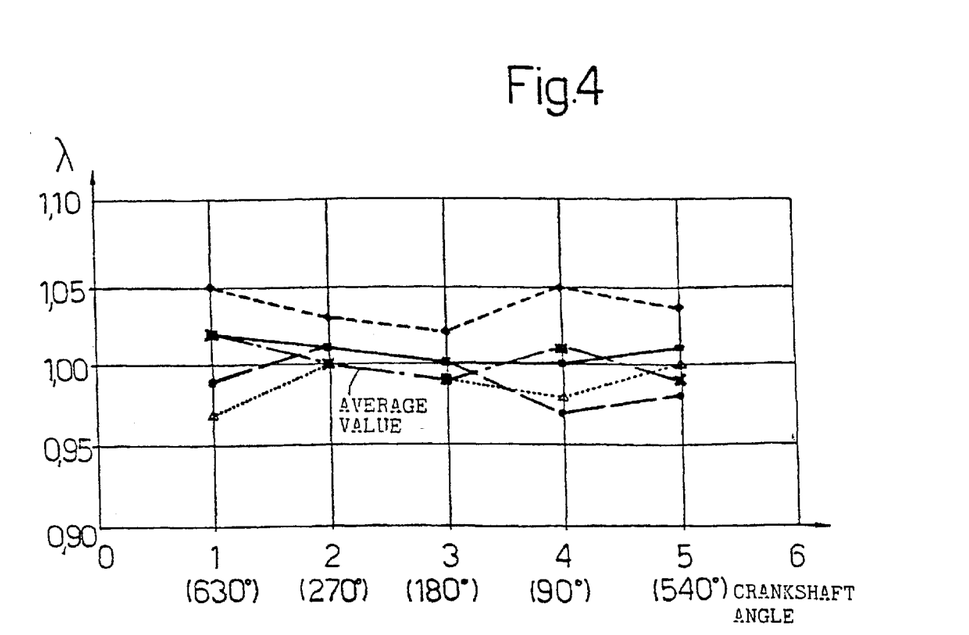
FIG. 4 is a diagram illustrating the influence of the phasing of the injection on the ratio between air and injected liquid LPG in the various cylinders of the engine.

In FIG. 4 there is plotted an exemplary diagram of this circumstance. This diagram illustrates the values of the metering λ=air/LPG in the various cylinders 4 of the engine 2, as well as the average value of the various cylinders 4 for different angular positions of the crankshaft 5 in correspondence with which the commencement of injection is effected.

As can be seen, upon variation of the phasing of the injection, the values of λ in the various cylinders 4 are nevertheless within the admissible range and the variation of the average value of the metering into the various cylinders is substantially constant with variation in the phasing.

To utilise methane or LPG as a fuel inevitably requires the introduction of modifications to the structure of the engine 2.

To effect this it is necessary to consider that because of the gaseous state of the methane the volumes involved are on average from two to three orders of magnitude greater than those of a petrol injection system. This signifies that an ejector device intended for the ejection of methane is of different dimensions from that of a petrol injector device. This leads as a consequence to the fact that the structure of the petrol injection engine is not immediately usable for the injection of methane. In particular the seats of the injector device of the petrol engine are too small to receive methane injector devices. On the other hand, it would be desirable to effect transformation from petrol engine to methane engine without modifying the structure and geometry of the engine in any substantial way.

Figure 5:
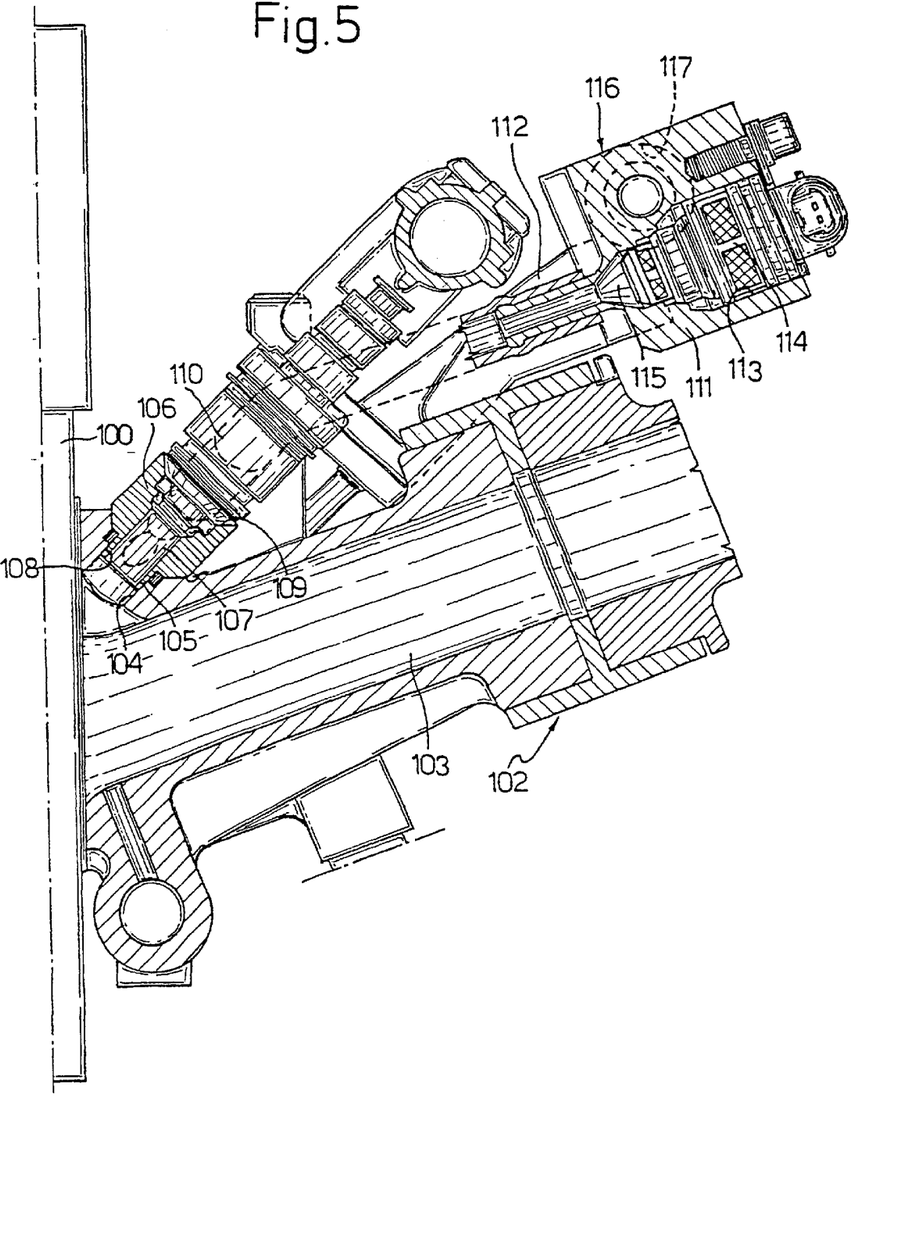
FIG. 5 is a sectional view of a detail of the first embodiment of a device utilised for adapting a petrol engine for operation with fuel gas.
Figure 6:
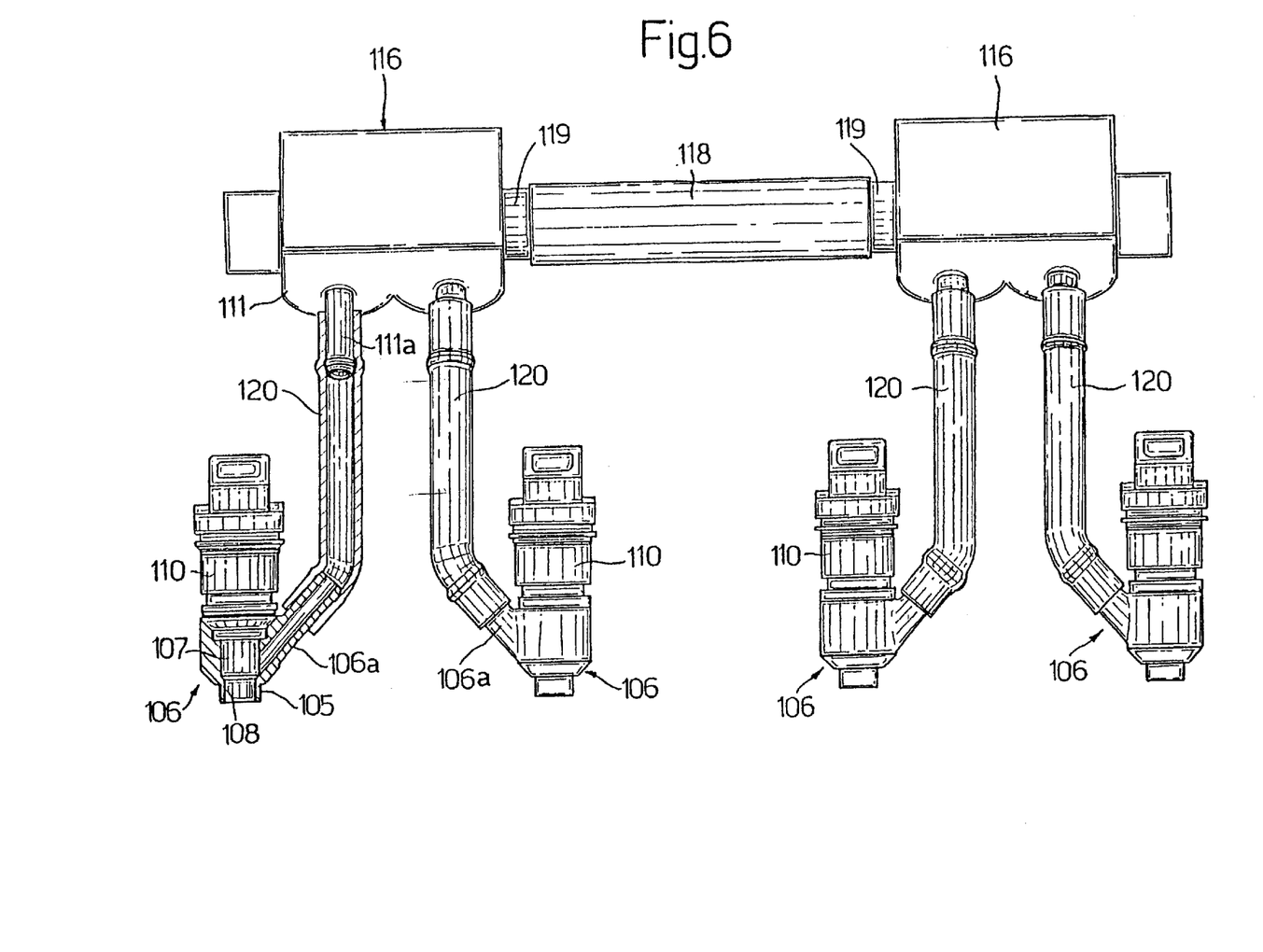
FIG. 6 is a front view of the device in FIG. 1.

With reference to FIGS. 5 and 6, the number 100 indicates the cylinder head of an internal combustion engine initially provided for petrol injection. The cylinder head 1 has fixed to it an induction manifold 102 having a plurality of ducts 103 (only one of which is visible in FIG. 1) each intended to supply air to the cylinders of the engine. In correspondence with each duct 103 the wall of the induction manifold has a hole 104 which originally constitutes the seat for the petrol injector device.

For the purpose of adapting the hole 104 both to the petrol injector and to a further fuel gas injector device, into each hole 104 there is fitted a tubular portion 105 of an adapter element 106 having a body of substantially cylindrical shape having an internal cavity 107 opening out through an outlet hole 108 defined within the portion 105.

The various adapter elements 106 (FIG. 6) are thus mounted within the corresponding seats 104 in place of the petrol injector devices with which the engine was originally provided.

Still with reference to FIGS. 5 and 6, the body of each adapter element 106 has on its end opposite the tubular portion 105 a seat 109 coaxial with the outlet hole 108, which receives the usual petrol injector device 110. This latter is therefore disposed with its axis coincident with that of the hole 104 but in a slightly retracted position with respect to the conventional mounting in an engine functioning solely with petrol injection.

Each cylinder of the engine has also associated therewith, in addition to the first adapter element 106, a second adapter element 111 the body of which is separate and spaced from the first element 106 and is supported by a bracket 112. For each cylinder of the engine the associated second adapter element 111 has a seat 113 for a corresponding fuel gas injector device 114. The seat 113 communicates with a cavity 115 within the element 111 which is in turn put into communication with the interior cavity 107 of the first element 106 via a flexible rubber or like tube 120 the ends of which are fitted respectively onto tubular connectors 106a, 111a provided on the first adapter element 106 and on the second adapter element 111.

In the case of the illustrated embodiment (FIG. 6) the second adapter elements 111 are associated in pairs with a single body 116 which has an internal cavity 117 constituting a fuel gas supply manifold. The two internal ducts 117 of the two groups 116 are in communication with one another by means of a flexible rubber sleeve 118 the ends of which are fitted onto connectors 119 projecting from the structure 116. Naturally, it would be possible to provide a single structure incorporating all the second actuator elements within it, or, again, on the other hand, the adapter elements 111 could all be separate from one another.

Figure 7:
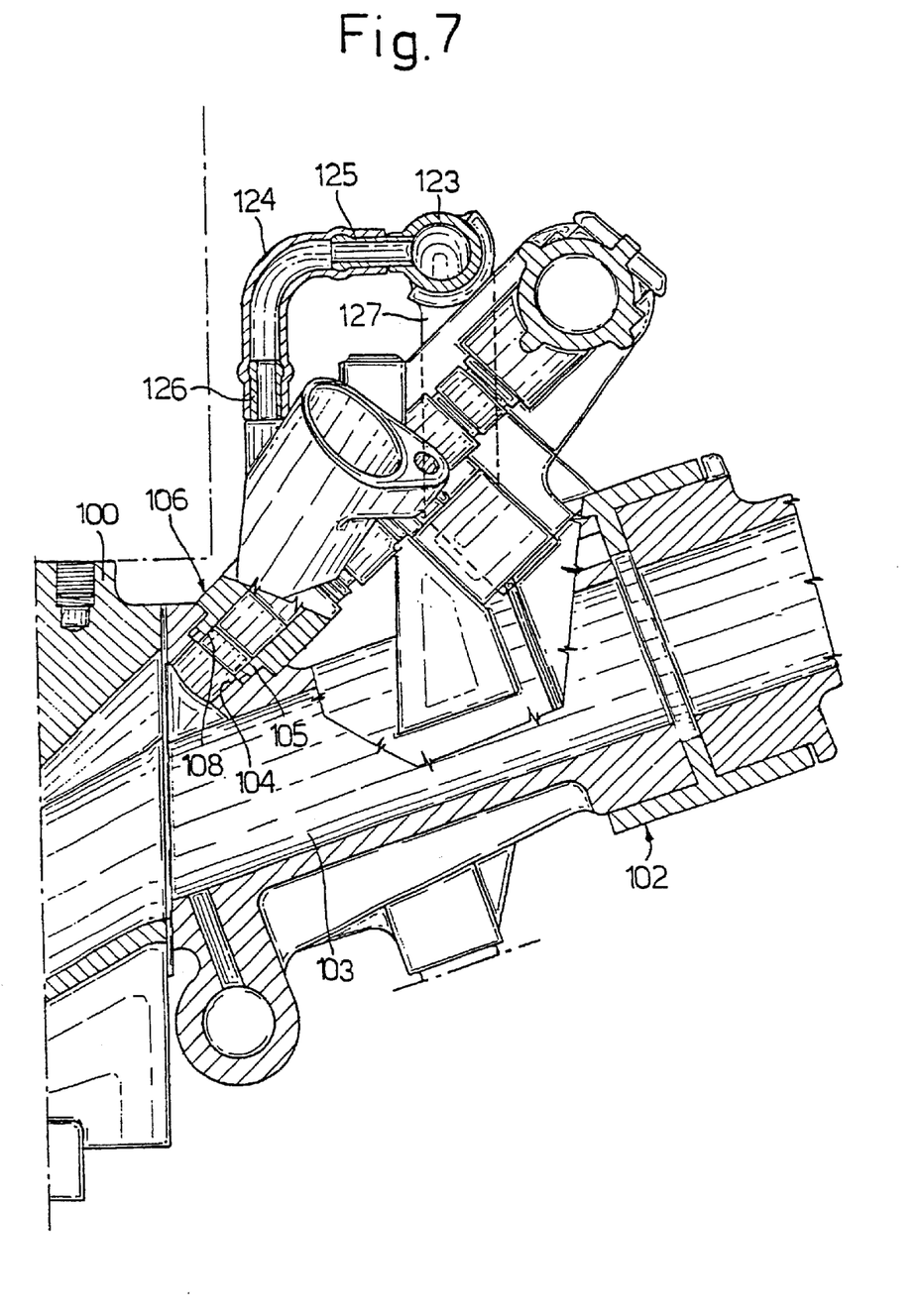
FIG. 7 is a sectional view of a detail of a second embodiment of the device utilised for adapting a petrol engine for operation with fuel gas.
Figure 8:
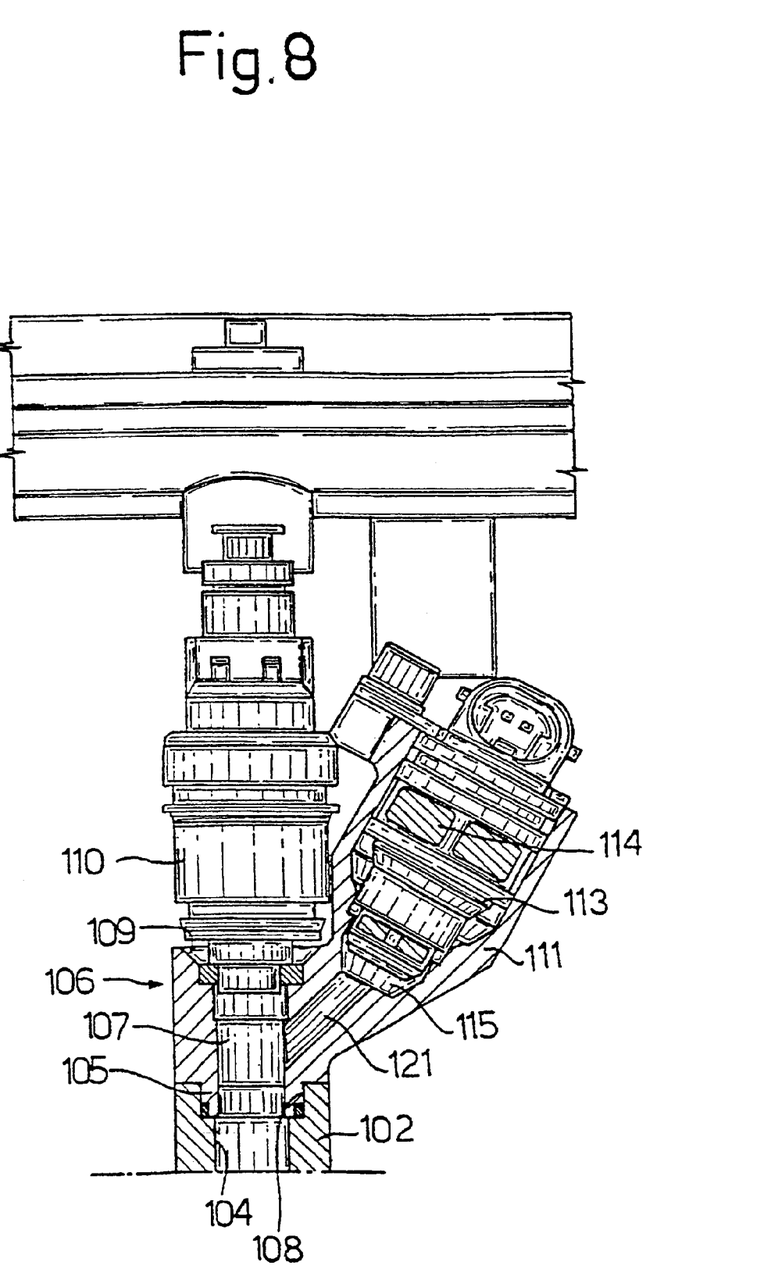
FIG. 8 is a sectional view of the device of FIG. 7.

FIGS. 7 and 8 refer to a second embodiment in which the position of each fuel gas injector device is less spaced from the outlet hole 108. In these figures the parts corresponding to those of FIGS. 5 and 6 have been indicated with the same reference numerals.

The main difference between the arrangement of FIGS. 7 and 8 and that of FIGS. 5 and 6 lies in the fact that in this case the two elements 106, 111 are incorporated in a single piece, the interior cavity 107 of which communicates with the seat 115 of the fuel gas injector device 114 by means of an internal duct 121. In this case, therefore, each cylinder has an associated adapter member 106, 111 separate from the others. The various adapter members 106, 111 are put into communication with a manifold duct 123 by means of respective flexible rubber tubes 124 the ends of which are fitted onto connectors 125, 126 formed respectively on the said manifold duct 123 and on the various elements 111. The manifold duct 123 is constituted by a separate element from the adapter members 106, 111 and supported by means of a bracket 127 (FIG. 7).

As will be seen from the preceding description, the device described both in the embodiment illustrated in FIGS. 5 and 6 and in the embodiment illustrated in FIGS. 7 and 8 makes it possible to transform a petrol engine with simple, rapid and economic operations into an engine adapted to operate selectively with petrol injection or fuel gas injection.

Finally it is clear that the control method and the injection system 1 described and illustrated here can have modifications and variations introduced thereto without by this departing from the protective ambit of the present invention.

For example, the control device 40 described above may not include the selective de-coupling device 41 of the control member 20 from the butterfly valve 27 in that the control member 20 may not be connected to the butterfly valve 27 and the regulation of the position of the butterfly valve 27 could be managed directly by the electronic central control unit 48 through the regulation device 42.

Moreover, the present method may also be used for controlling internal combustion engines operating solely with fuel gas injection.

What is claimed is:

1. A method for controlling the operation of a throttled fuel injection system for a multi-cylinder internal combustion engine which can operate selectively with gasoline injection or fuel gas injection, comprising when supplying fuel gas to the cylinders, in each engine cycle supplying the fuel gas selectively to some of the cylinders of the engine based on the power required, and when supplying gasoline, supplying the gasoline to all of the cylinders.

2. A method according to claim 1, wherein the method includes selecting a quantity of fuel gas supplied to each of the cylinders.

3. A method according to claim 1, wherein the method includes selecting, in each successive engine cycle, different cylinders to supply with fuel gas according to a predetermined scheme of rotation.

4. A method according to claim 1, wherein the throttled fuel injection system includes a plurality of electric fuel gas injectors associated with respective cylinders; a main duct for aspiration of air; a butterfly valve disposed within the main duct; and a control member for controlling the butterfly valve, and the method further comprises:
    generating a speed signal (RPM) correlated to a speed of the engine;
    generating a first position signal ($\Phi$) correlated to a phase of the engine;
    generating a second position signal ($\theta$) correlated to a position of the control member; and
    selecting, in said each engine cycle and based on the speed signal (RPM) and the position signals ($\Phi,\theta$), a number of the injectors to be actuated and which of the injectors to actuate.

5. A throttled injection system for a multi-cylinder internal combustion engine operable selectively with gasoline injection or fuel gas injection, comprising a selective fuel gas supplier operable to supply fuel gas, in each engine cycle, selectively to some of the cylinders of the based on the power required, and a gasoline supplier operable to supply gasoline to all of the cylinders.

6. A system according to claim 5, further comprising a first selector for selecting a quantity of fuel gas supplied to each of the cylinders.

7. A system according to claim 6, further comprising a second selector operable to select, in successive engine cycles, different cylinders to be supplied with the fuel gas according to a predetermined scheme of rotation.

8. A system according to claim 7, further comprising:
    a plurality of fuel gas injectors associated with respective cylinders;
    a main air induction duct;
    a butterfly valve disposed within the main duct;
    a control member for controlling the butterfly valve;
    a speed sensor generating a speed signal (RPM) correlated to a speed of the engine;
    first position sensor generating a first position signal ($\Phi$) correlated to a phase of the engine;
    a second position sensor generating a second position signal ($\theta$) correlated to a position of the control member; and
    a third selector operable to select, in said each engine cycle and based on the speed signal (RPM) and the said position signals ($\Phi, \theta$) a number of the injectors to be actuated and which of the injectors to actuate.

9. A method for controlling the operation of a fuel injection system for a multi-cylinder internal combustion engine which can operate selectively with gasoline injection or fuel gas injection, said system having a plurality of electric fuel gas injectors associated with respective cylinders; a main duct for aspiration of air; a butterfly valve disposed within the main duct; and a control member for controlling the butterfly valve, comprising:
    when supplying fuel gas to the cylinders, in each engine cycle, supplying the fuel gas selectively to some of the cylinders of the engine based on the power required, and when supplying gasoline, supplying the gasoline to all of the cylinders;
    generating a speed signal (RPM) correlated to a speed of the engine;
    generating a first position signal ($\Phi$) correlated to a phase of the engine;
    generating a second position signal ($\theta$) correlated to a position of the control member; and
    selecting, in said each engine cycle and based on the speed signal (RPM) and the position signals ($\Phi, \theta$), a number of the injectors to be actuated and which of the injectors to actuate.

10. A method according to claim 9, wherein the method further comprises:
    generating an engine temperature signal (T);
    comparing the temperature signal (T) with a predetermined threshold value ($T_0$); and
    generating a fuel gas reduction command signal for reducing the quantity of fuel gas supplied to the engine when the temperature signal (T) exceeds the predetermined threshold value ($T_0$).

11. A method according to claim 9, wherein the generating the fuel gas reduction command signal comprises stopping some of the injectors from being actuated.

12. An injection system for a multi-cylinder internal combustion engine, operable selectively with gasoline injection or fuel gas injection, comprising:
    a selective fuel gas supplier operable to supply fuel gas, in each engine cycle, selectively to some of the cylinders of the based on the power required;
    a first selector for selecting a quantity of fuel gas supplied to each of the cylinders;
    a gasoline supplier operable to supply gasoline to all of the cylinders;
    a second selector operable to select, in successive engine cycles, different cylinders to be supplied with the fuel gas according to a predetermined scheme of rotation;
    a plurality of fuel gas injectors associated with respective cylinders;
    a main air induction duct;
    a butterfly valve disposed with the main duct;
    a control member for controlling the butterfly valve;
    a speed sensor generating a speed signal (RPM) correlated to a speed of the engine;
    a first position sensor generating a first position signal ($\Phi$) correlated to a phase of the engine;
    a second position sensor generating a second position signal ($\theta$) correlated to a position of the control member; and
    a third selector operable to select, in each engine cycle and based on the speed signal (RPM) and the position signals ($\Phi, \theta$) a number of the injectors to be actuated and which of the injectors to actuate.

13. A system according to claim 12, further comprising:
    a temperature sensor operable to generate an engine temperature signal (T);
    a comparator operable to compare the engine temperature signal (T) with a predetermined threshold value ($T_0$); and
    a fifth signal generator operable to generate a fuel gas reduction command signal for reducing the quantity of fuel gas supplied to the engine when the temperature signal (T) exceeds the predetermined threshold value ($T_0$).

14. A method for controlling the operation of a fuel injection system for a multi-cylinder internal combustion engine which can operate selectively with gasoline injection or fuel gas injection, comprising:

when supplying fuel gas to the cylinders, in each engine cycle, supplying the fuel gas selectively to some of the cylinders of the engine based on the power required, and when supplying gasoline to the cylinders, supplying the gasoline to all of the cylinders; and selecting, in each successive engine cycle, different cylinders to supply with fuel gas according to a predetermined scheme of rotation.

15. An injection system for a multi-cylinder internal combustion engine operable selectively with gasoline injection or fuel gas injection, comprising:

a selective fuel gas supplier operable to supply fuel gas, in each engine cycle, selectively to some of the cylinders of the engine based on the power required;

a gasoline supplier operable to supply gasoline to all of the cylinders;

a first selector for selecting a quantity of fuel gas supplied to each of the cylinders; and a second selector operable to select, in successive engine cycles, different cylinders to be supplied with the fuel gas according to a predetermined scheme of rotation.

16. A method for controlling the operation of a throttled fuel injection system for a multi-cylinder internal combustion engine which can operate selectively with gasoline injection or fuel gas injection, comprising:

supplying fuel gas or gasoline to the cylinders;

generating an engine temperature signal (T);

comparing the temperature signal (T) with a predetermined threshold value ($T_0$); and generating a fuel gas reduction command signal for reducing the quantity of fuel gas supplied to the engine when the temperature signal (T) exceeds the predetermined threshold value ($T_0$), wherein, in each engine cycle, when supplying the fuel gas, the fuel gas is supplied selectively to some of the cylinders of the engine based on a power required, and when supplying the gasoline, the gasoline is supplied to all of the cylinders.

17. A throttled injection system for a multi-cylinder internal combustion engine operable selectively with gasoline injection or fuel gas injection, comprising:

a selective fuel gas supplier operable to supply fuel gas, in each engine cycle, selectively to some of the cylinders of the engine based on a power required;

a gasoline supplier operable to supply gasoline to all of the cylinders;

a temperature sensor operable to generate an engine temperature signal (T);

a comparator operable to compare the engine temperature signal (T) with a predetermined threshold value ($T_0$); and a signal generator operable to generate a fuel gas reduction command signal for reducing the quantity of fuel gas supplied to the engine when the temperature signal (T) exceeds the predetermined threshold value ($T_0$).

\* \* \* \* \*